United States Patent Office 3,219,315
Patented Nov. 23, 1965

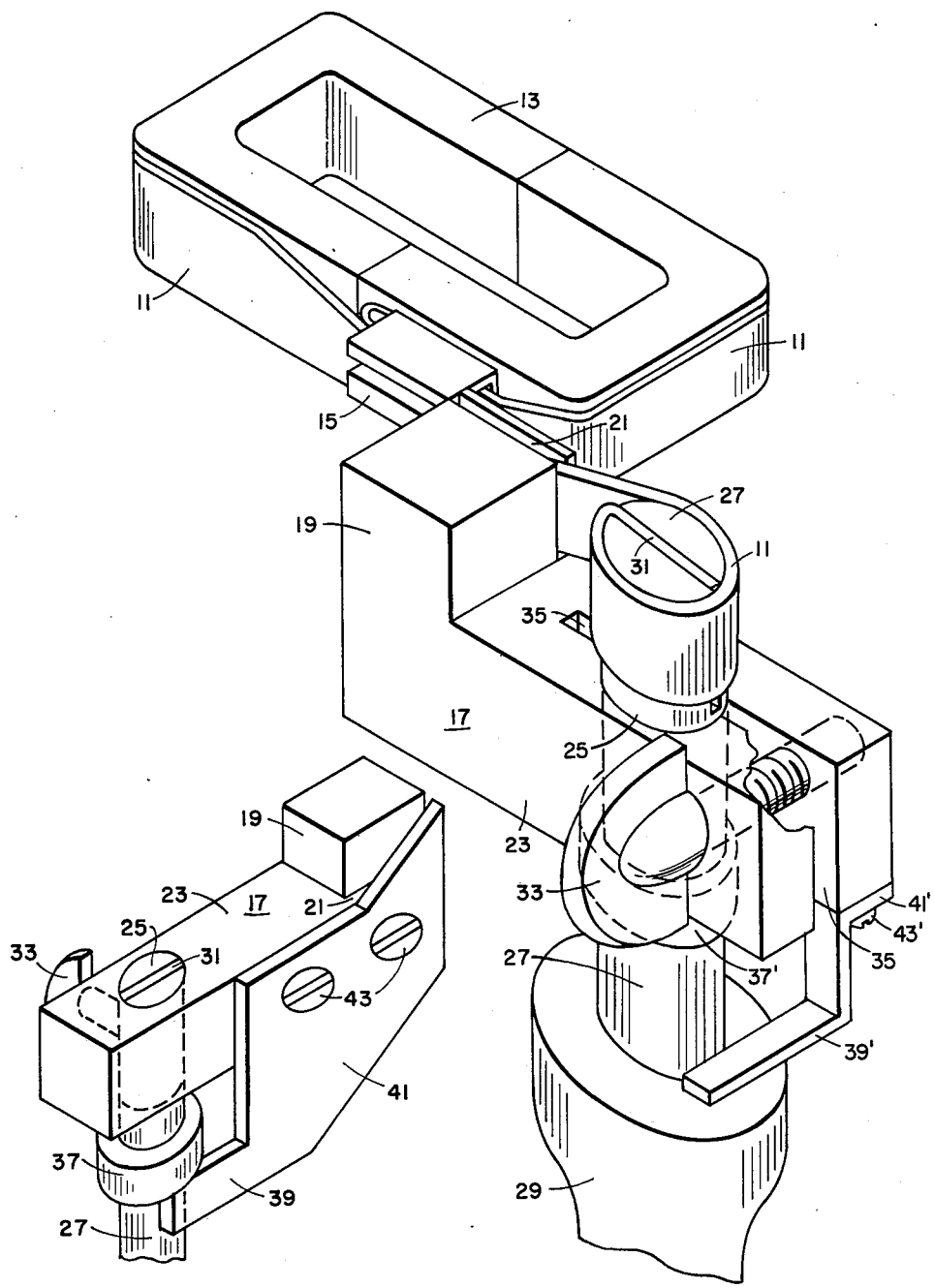

3,219,315
DEVICE FOR BANDING ELECTRIC PARTS
Mansel C. Harris, Mesquite, Tex., assignor to The Atlantic Refining Company, Philadelphia, Pa., a corporation of Pennsylvania
Filed Mar. 11, 1963, Ser. No. 264,323
6 Claims. (Cl. 254—51)

This invention pertains to a small, hand-operated device for tightening banding around relatively small electric parts.

In banding electric parts, it is desirable that the tightening device be free of interfering parts which slow down the banding operation or cause the tightening device to twist or slip. It is also desirable that the operator have complete control of the rate of tightening and the amount of tension applied. Preferably, the take up part of the tightening device should be such that the operator keenly senses the amount of tension being applied at all times.

Once the banding has been tightened and clipped, the operator should be able to remove the tightening device quickly and easily with a minimum of stress on the banded part. Sometimes in assembling electronic equipment, it is necessary to temporarily band the parts and perform certain operations on the parts. The banding is then repositioned. In such cases, it is often desirable to relax only part of the tension on the banding so that the relation of the parts is not distributed.

In banding electric parts, it is also desirable that the tightening device be small, light, portable and easy to manipulate with either hand.

Accordingly, it is an object of this invention to provide a device for tightening banding about electric parts that has the above desirable features and is inexpensive to make, rugged, durable with few parts to wear, slip or break, suitable to a wide range of banding materials and simple to use yet surprisingly effective.

Still further objects and advantages of this invention will be apparent from the following description, appended claims and accompanying drawings in which:

FIGURE 1 is a fragmentary, isometric view of the tightening device of this invention partially broken to illustrate a clamping means of the device.

FIGURE 2 is a fragmentary, isometric view of the device showing a different clamping means and a stop means.

Briefly, the tightening device of this invention is to be used for tightening banding about the periphery of an object and includes an L-shaped base with a guide slot through a first extension thereof for passage of the banding therethrough and a cylindrical hole through a second extension thereof. The axis of the hole is generally parallel to the direction that the first extension extends from the second extension. Passing slideably and rotatably through the hole in the base is a turning means which includes a cylindrical extension and a handle for turning the cylindrical extension. The cylindrical extension has a slot formed in its end parallel to central longitudinal axis for receiving the free end of the banding from the guide slot in the first extension of the base. There is included clamping means for locking the cylindrical extension of the turning means in any desired rotational position and stop means to limit the longitudinal movement of the cylindrical extension of the turning means through the cylindrical hole in the second extension of the base.

More specifically, as shown in FIGURE 1, the tightening device is in position for tightening banding 11 which extends around small transformer cores 13. One end of the banding passes through coupling means 15 and loops back between the coupling means and transformer cores. The other free end of the banding also passes through the coupling means and is connected to the tightening device. Coupling means 15 is any form of seal, clip, buckle or other device designed to aid in banding electrical parts.

The tightening device includes L-shaped base 17 which is capable of withstanding forces created during banding. The L-shaped base has guide slot 21 extending through first extension 19 of the L-shaped base for passage of banding therethrough. As shown, the first extension engages coupling means 15 when banding 11 is inserted through guide slot 21. The guide slot should be at least as deep as the width of the banding, and, preferably, will be less than one-eighth inch from the side edge of the first extension. Where the banding may be wound in either direction, two guide slots may be provided with one near each side edge.

Through second extension 23 of the L-shaped base is cylindrical hole 25. The axis of the cylindrical hole is generally parallel to the direction that the first extension extends from the second extension of the L-shaped base. Extending slideably and rotatably through cylindrical hole 25 is turning means including cylindrical extension 27 and handle 29 by which the cylindrical extension is turned. The cylindrical extension is at substantially a right angle to the longitudinal axis of the banding and is of sufficient strength to apply the forces needed to tighten the banding. In the end of cylindrical extension 27 parallel to its central longitudinal axis and traversing its diameter is slot 31 which receives the free end of banding 11 from guide slot 21 in the L-shaped base. Slot 31 should be at least as deep as the width of the banding. Handle 29 may be any means by which the operator may apply a twisting force to the cylindrical extension, but, preferably, the handle will be similar to a screwdriver handle since this type of handle allows the operator to take up the banding continuously at quick or slow rates while keenly sensing the amount of tension being applied at all times.

In L-shaped base 17 is clamp means 33 which clamps the cylindrical extension of the turning means in any desired rotational position thereby preventing relative rotational movement between the cylindrical extension and the L-shaped base. In FIGURE 2, the clamp means is a thumb screw mounted in the second extension of the base and, upon being tightened against the cylindrical extension of the turning means, clamps the extension in any position. In FIGURE 1, there is clamping slot 35 which is a second slot in the L-shaped base that is formed in the second extension thereof and extends to at least cylindrical hole 25. Preferably, the clamping slot will extend into the second extension beyond the cylindrical hole. The clamping slot divides the second extension to form a fork-like end of spaced parallel portions which upon deformation inwardly toward each other cause the walls of the cylindrical hole to tightly clamp cylindrical extension 27 in any desired rotational position. In FIGURE 1, clamp means 33 is a thumb screw mounted in the second extension of the L-shaped base and, when tightened, applies a force to squeeze the clamping slot inwardly. As an alternative, when the tightening device is to be used in different positions, there may be a clamping means on either or both sides of the second extension of the L-shaped based.

Consider now how the tightening device is used in tightening banding around electric parts. Generally, the banding is in roll form. In the following description, the desired length of banding will be precut from the roll prior to banding the part; however, the tool could be used with the banding still connected to the roll if desired.

One end of the banding is threaded through coupling means 15 and bent inward under the coupling where this end of the banding is usually soldered to the clip or to the banding. The other end of the banding is passed around the electric part through the coupling to be eventually fastened to cylindrical extension 27. The operator takes the device with the cylindrical extension either removed therefrom or slipped back so that the surface of the second extension of the L-shaped base is substantially free of any interfering parts. The banding is passed through guide slot 21 with the narrow part of the first extension between that part of the banding passing to the tool and the part encircling the electric part and with the first extension held firmly against the coupling. Since guide slot 21 is open at the top, the operator can easily and quickly slip the banding into the guide slot. Holding the first extension against the coupling, the operator pulls the banding straight through the guide slot quickly taking up excess slack without interference from other parts, and without tending to undesirably bend or shift the position of the tool and banding. Still holding the banding tight, the operator slips the cylindrical extension of the turning means about the banding by way of the slot in the end thereof and by turning handle 29 the operator very quickly tightens the banding about the electric part to prevent slippage thereof and fasten the banding to the cylindrical extension. The operator locks the cylindrical extension in position by twisting thumb screw 33 to squeeze clamping slot 35 and cylindrical hole 25. The banding is then soldered to the coupling and the operator may quickly remove the tightening device simply by pulling the device away from longitudinal axis of the banding so that the banding slides out of the slots. Usually, the end of the banding is bent back over the coupling and soldered again. In operations where the banding is temporarily placed in one position while certain operations are performed on the parts thus held together and the banding is later shifted to a new position, the operator can relax the tension on the banding just enough to permit the banding to be shifted without affecting the position of the banded electric parts relative to each other; or if desired, the operator may quickly release the banding altogether.

The above description will aid in understanding a feature of the tightening devices of FIGURES 1 and 2 where there is shown stop means 37 for limiting the longitudinal movement of the cylindrical extension of the turning means through the cylindrical hole in the second extension of the L-shaped base. As shown, stop means 37 or 37' is an enlarged portion on cylindrical extension 27 formed by collar fixedly mounted on the cylindrical extension.

In FIGURES 1 and 2, the second extension of the L-shaped base extends in a direction opposite that of the first extension of the base. The bottom of this extended portion of the second extension has lug 39 or 39' which extends to a point adjacent cylindrical extension 27 of the turning means. This lug cooperates with stop means 37 or 37' to prevent the turning means from being removed from the cylindrical hole in the second extension of the L-shaped base. Preferably, as shown, the lug is a part of plate 41 or 41' which is bolted to the L-shaped base by bolts 43 or 43'. As shown in FIGURE 2, the plate may also form one side of guide slot 21.

It is understood that modifications may be made in the details of the preferred embodiment illustrated and described without departing from the scope of this invention and that such modifications are covered hereby.

I claim:

1. A device for tightening banding about the periphery of an object comprising a generally L-shaped base having a first and a second extension, a first slot through said first extension for passage of said banding therethrough, said slot being open at three edges, a cylindrical hole through said second extension, the axis of said hole being generally parallel to the direction that said first extension extends from said second extension, turning means including a cylindrical extension adapted to rotatably and slideably pass through said hole in said base and a handle adapted to turn said cylindrical extension, said cylindrical extension having an open-ended slot formed in its end parallel to its central longitudinal axis and adapted to receive the free end of said banding from said first slot in said base, clamp means in said base adapted to clamp said cylindrical extension of said turning means in all desired rotational positions and to prevent longitudinal movement of said cylindrical extension relative to said base, and stop means adapted to allow a limited amount of longitudinal movement of the slotted end of the cylindrical extension of the turning means in the cylindrical hole toward the second extension of the base away from the banding, said limited amount of longitudinal movement being great enough to free the banding from said slotted end of said cylindrical extension and less than the distance required to remove said turning means from said cylindrical hole in said second extension of said base.

2. The device of claim 1 wherein the second extension of said base extends in a direction opposite that of the first extension of said base and a lug extends from the bottom of said extended portion to a point adjacent said cylindrical extension of said turning means, and the stop means is a collar fixedly mounted on said cylindrical extension of said turning means and cooperating with said lug to allow the limited amount of longitudinal movement.

3. The device of claim 1 wherein there is a second slot formed in the second extension of said base and extending at least to the cylindrical hole, and the clamp means is a thumb screw mounted in said second extension of said base and adapted to apply a force to squeeze said second slot.

4. The device of claim 3 wherein the second extension of said base extends in a direction opposite that of the first extension of said base and a lug extends from the bottom of said extended portion to a point adjacent said cylindrical extension of said turning means, and the stop means is a collar fixedly mounted on said cylindrical extension of said turning means and cooperating with said lug to allow the limited amount of longitudinal movement.

5. The device of claim 1 wherein the clamp means is a thumb screw mounted in the second extension of said base and adapted to tighten against said cylindrical extension of said turning means.

6. The device of claim 5 wherein the second extension of said base extends in a direction opposite that of the first extension of said base and a lug extends from the bottom of said extended portion to a point adjacent said cylindrical extension of said turning means, and the stop means is a collar fixedly mounted on said cylindrical extension of said turning means and cooperating with said lug to allow the limited amount of longitudinal movement.

References Cited by the Examiner

UNITED STATES PATENTS

| | | | |
|---|---|---|---|
| 494,733 | 4/1893 | Campbell | 287—133 |
| 588,401 | 8/1897 | Crowell | 287—133 |
| 1,353,338 | 9/1920 | Gunn | 81—9.3 |
| 1,541,136 | 6/1925 | Gunn | 81—9.3 |
| 1,833,168 | 11/1931 | MacChesney et al. | 254—51 |
| 2,513,438 | 7/1950 | Weir | 81—9.3 |

WILLIAM FELDMAN, *Primary Examiner.*

MILTON S. MEHR, *Examiner.*

UNITED STATES PATENT OFFICE
CERTIFICATE OF CORRECTION

Patent No. 3,219,315                                                  November 23, 1965

Mansel C. Harris

It is hereby certified that error appears in the above numbered patent requiring correction and that the said Letters Patent should read as corrected below.

Column 1, line 28, for "distributed" read -- disturbed --; column 2, line 61, for "based" read -- base --.

Signed and sealed this 13th day of September 1966.

(SEAL)
Attest:

ERNEST W. SWIDER                                  EDWARD J. BRENNER
Attesting Officer                                         Commissioner of Patents